United States Patent
Shono (10) Patent No.: US 6,603,566 B1
(45) Date of Patent: Aug. 5, 2003

(54) IMAGE FORMING APPARATUS, IMAGE PROCESSING METHOD, AND RECORDING MEDIUM

(75) Inventor: Seita Shono, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/406,719

(22) Filed: Sep. 28, 1999

(30) Foreign Application Priority Data

Sep. 28, 1998 (JP) ............................................ 10-273132

(51) Int. Cl.$^7$ .............................................. G06K 15/00
(52) U.S. Cl. ....................................... 358/1.13; 358/1.9
(58) Field of Search .......................... 358/1.1, 1.9, 1.13, 358/1.14, 2.1, 3.01, 3.06, 3.24, 3.21, 518, 523; 382/162, 167, 166, 274

(56) References Cited

U.S. PATENT DOCUMENTS

| | | | |
|---|---|---|---|
| 5,579,090 A | 11/1996 | Sasanuma et al. | 355/208 |
| 5,754,309 A | * 5/1998 | Chen et al. | 358/3.1 |
| 5,835,243 A | 11/1998 | Mori | 358/518 |
| 6,437,877 B1 | * 8/2002 | Takei | 358/1.9 |

* cited by examiner

*Primary Examiner*—Arthur G. Evans
(74) *Attorney, Agent, or Firm*—Fitzpatrick, Cella, Harper & Scinto (57) ABSTRACT

In order to stabilize image quality in both a copier mode and a printer mode without placing a significant burden on a user, there is provided an image forming apparatus including a reading device for reading an original document and producing first image signals; an input device for inputting second image signals from an external apparatus; an image forming device for forming an image on a recording medium on the basis of the first and second image signals produced by the reading device and input by the input device, respectively; a calibration device for calibrating image processing conditions corresponding to image forming characteristics in a copier mode; and a production device for producing image processing conditions in a printer mode on the basis of the calibrated image processing conditions, wherein the image forming apparatus has the copier mode in which an image is formed by using the reading device and the image forming device and the printer mode in which an image is formed by using the input device and the image forming device.

6 Claims, 6 Drawing Sheets

IMAGE FORMING APPARATUS, IMAGE PROCESSING METHOD, AND RECORDING MEDIUM

BACKGROUND OF THE INVENTION

1. Field of the Invention

The present invention relates to an image forming apparatus and an image processing method for optimizing image correction conditions, and to a recording medium therefor.

2. Description of the Related Art

In image recording apparatuses for recording and outputting an image, the image quality (in particular, gradation characteristics) of the output image becomes unstable due to various factors. In particular, in color recording apparatuses, variations of gradation are often noticeable.

For example, in a recording apparatus using an electrophotographic method in which color toner is used as a coloring material, variations of apparatus parts, such as light-emission characteristics of a laser, and photosensitive characteristics of a photosensitive body, and variations in printing characteristics due to environmental variations such as temperature, humidity, etc., are factors resulting in unstable image quality.

As methods for correcting such instability of image quality, several methods have been conventionally conceived. For example, in a recording apparatus taking the form of, for example, a copier, a monochromatic gradation patch of each of the CMYK colors (cyan, magenta, yellow, and black) is printed and is read by a reader, and a one-dimensional gradation correction table such as that having predetermined gradation characteristics is produced for each of the CMYK colors, and this is used for gradation conversion ($\gamma$ conversion).

In another example, a copier is used as a printer. In this case, gradation conversion using this gradation correction table is performed on multi-valued data sent from a printer controller.

Recently, from the viewpoint of cost and in order to reduce the load on a bus, the number of systems in which a printer controller forms image data into binary values and then sends them to a print engine, and the print engine performs binary recording based on the received binary data is increasing.

In such a case, since binary data is received from the printer controller, it is not possible for the print engine to correct the gradation. Also, when the binarization method differs between when it is used as a copier and when it is used in a printer, the printer controller must perform its own gradation correction corresponding to the binarization method performed by the printer controller. Accordingly, since a conventional printer controller which does not have the function for producing a gradation correction table produces a gradation correction table on the basis of manual instructions from a user, the user is required to perform a complex operation.

SUMMARY OF THE INVENTION

It is an object of the present invention to stabilize image quality in both a copier mode and a printer mode without placing a significant burden on a user.

To achieve the above-mentioned object, according to a first aspect of the present invention, there is provided an image forming apparatus comprising: a reading unit for reading an original document and producing first image signals; an input unit for inputting second image signals from an external apparatus; an image forming unit for forming an image on a recording medium on the basis of the first and second image signals produced by the reading unit and input by the input unit, respectively; a calibration unit for calibrating image processing conditions corresponding to image forming characteristics in a copier mode; and a production unit for producing image processing conditions in a printer mode on the basis of the calibrated image processing conditions. The image forming apparatus has the copier mode in which an image is formed by using the reading unit and the image forming unit and the printer mode in which an image is formed by using the input unit and the image forming unit.

It is another object of the present invention to easily produce image correction conditions corresponding to a different halftone method.

To achieve the above-mentioned object, according to a second aspect of the present invention, there is provided an image processing method for calibrating image correction conditions corresponding to each halftone process based on first and second halftone methods, the image processing method comprising the steps of: producing first image correction conditions corresponding to the first halftone method on the basis of pattern image signals which are obtained by reading a pattern image which is halftone-processed and output by the first halftone method; and producing second image correction conditions corresponding to the second halftone method from the first image correction conditions on the basis of the correlation between the first and second halftone methods.

Further objects, features, and advantages of the present invention will become more apparent from the following detailed description of embodiments of the present invention with reference to the accompanying drawings.

DESCRIPTION OF THE PREFERRED EMBODIMENTS

The preferred embodiments of the present invention will be described below in detail with reference to the accompanying drawings.

First Embodiment

Figure 2:
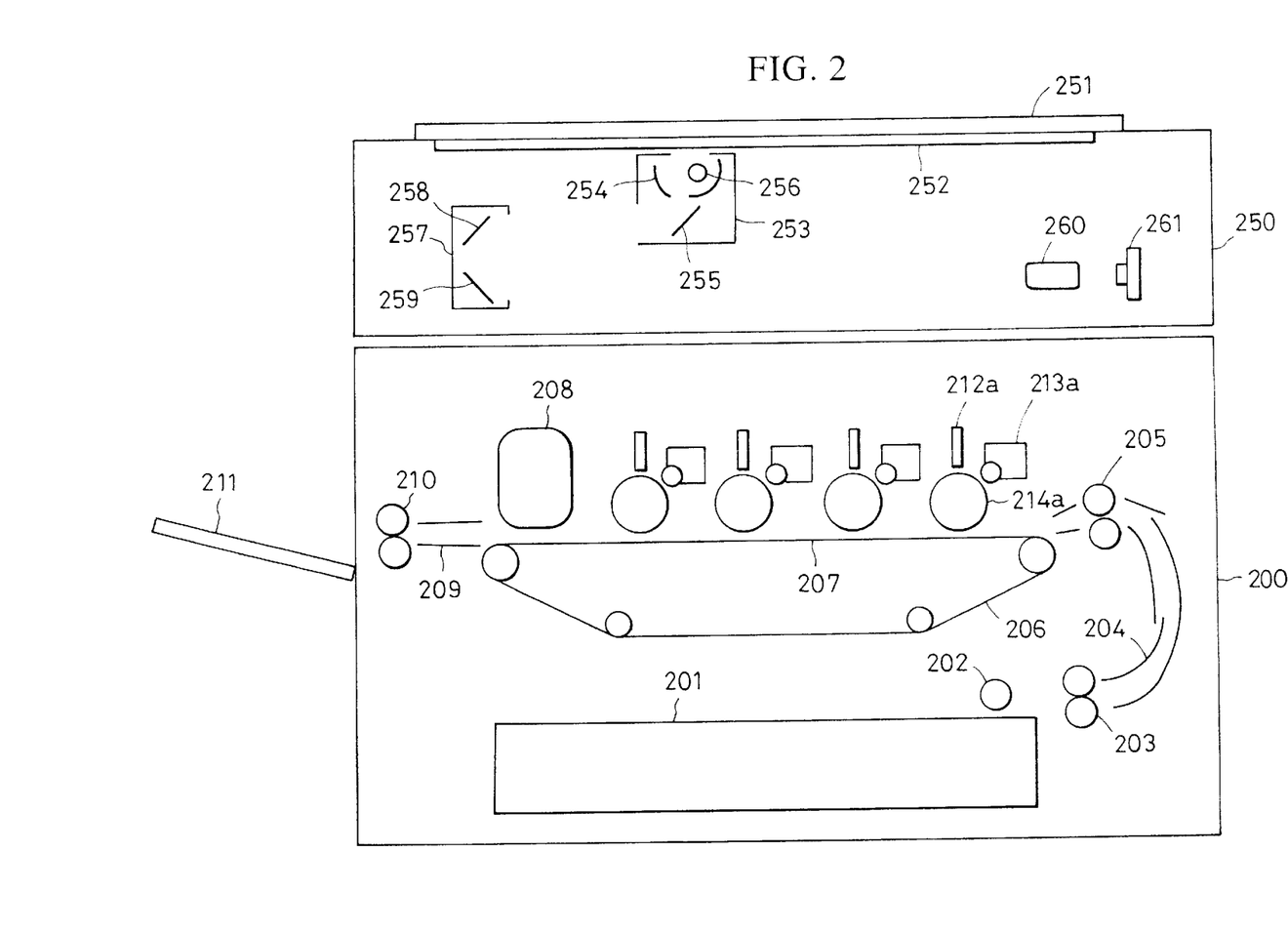
FIG. 2 is a view showing the internal construction of a copier.

FIG. 2 is a view showing the internal construction of a recording apparatus which is capable of copying an image according to a first embodiment of the present invention.

An original-document reading apparatus 250 obtains an image signal in such a way that an original document placed on a document-holder glass 252 is illuminated by light from an illumination lamp 256 and diffused by a diffusion plate 254, the reflected light is formed into an image on a CCD 261 through a lens 260 via mirrors 255, 258, and 259, and the image is photoelectrically converted. In the CCD 261 of this embodiment, 7200 pixels are arranged from the front to the rear portion and are formed of three columns of R (red), G (green), and B (blue) pixels.

A reading unit 253 in which the diffusion plate 254, the mirror 255, and the lamp 256 are mounted moves from side to side on a rail (not shown), and a mirror unit 257 in which the mirrors 258 and 259 are mounted also moves in synchronization therewith. As a result of these two units moving from side to side, the entire document is read. A document pressure plate 251 is used to press the document against the document-holder glass 252.

Paper is pulled by a pickup roller 202 out of a cassette 201 in which paper, which is a recording medium, is housed, and the paper is passed through first registration rollers 203, a guide plate 204, and second registration rollers 205 and is attached by suction onto a transport belt 206.

The image signal is separated into the four CMYK colors by image processing to be described later, and is sent to a printer 200. Of the four colors, the C (cyan) signal is converted into a light signal by an LED array 212a and is recorded as a latent image on a drum 214a. The latent image on the drum 214a is developed by a development unit 213a, and toner is applied to the drum. The developed toner is transferred onto the paper on a platen 207. Regarding the other colors, M (magenta), Y (yellow), and K (black), the image is transferred onto the paper in a similar manner by a well-known electrophotographic process by a set of an LED array, a drum, and a development unit.

The toner of each color transferred onto the paper is fixed onto the paper by a fixing unit 208. The paper which has been fixed is ejected onto a paper ejection tray 211 after passing through a paper ejection guide 209 and paper ejection rollers 210.

Figure 1:
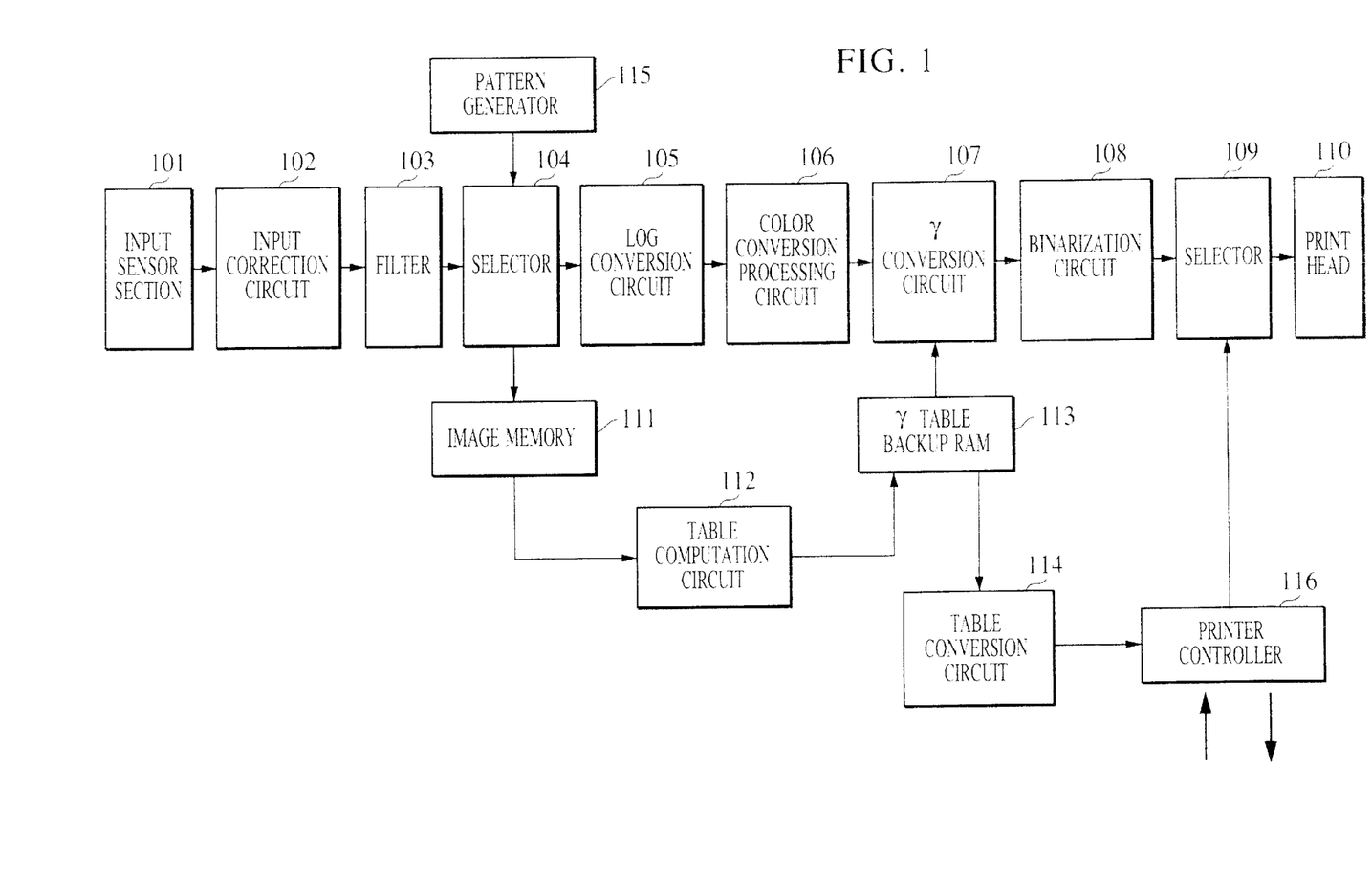
FIG. 1 is a block diagram of an image processing section according to a first embodiment of the present invention.

FIG. 1 is a block diagram of an image processing unit inside a copier.

An input sensor section 101 comprises a photoelectric conversion device, such as a CCD, and a driving apparatus for operating this device, and reads an original document. The document image data read by the input sensor section 101 is sequentially sent to an input correction circuit 102. In this circuit, the image data of each pixel is quantized into digital data, and shading correction for correcting sensitivity variations of the CCD sensor and light source illumination variations is performed by a digital computation process.

Reference numeral 103 denotes a digital filter circuit for performing edge highlighting and smoothing on input image data. Reference numeral 104 denotes a selector for selecting the input/output site of the image data. Reference numeral 105 denotes a LOG conversion circuit for converting RGB data into CMY data by using a look-up table. Reference numeral 106 denotes a color conversion processing circuit for performing a color conversion process corresponding to the color-development characteristics of a coloring material (printing toner) by using a multi-dimensional mapping table. Reference numeral 107 denotes a circuit for-performing gradation correction corresponding to the printing gradation characteristics of the printer, and is a γ conversion circuit for performing gradation correction by using a one-dimensional look-up table for each of the CMYK colors so that the gradation characteristics become linear. Reference numeral 108 denotes a binarization circuit for quantizing multi-valued image data into binary data by using an error diffusion technique. Reference numeral 109 denotes a selector for selecting whether the binary data binarized by the binarization circuit 108 or the binary data developed by the printer controller should be output to a print head. Reference numeral 110 denotes a print head for performing on/off control of the switching on of LEDs for each pixel so as to form an image on the basis of the binary data sent from the selector 109.

Reference numeral 111 denotes an image memory for storing the read image. Reference numeral 112 denotes a computation circuit for detecting the printing characteristics of the printer from the read image and for selecting or computing the most appropriate γ table. Reference numeral 113 denotes a RAM for backing up the γ table. Reference numeral 114 denotes a conversion circuit for converting the γ table which is most appropriate for copying into the γ table which is most appropriate for printing. Reference numeral 115 denotes a pattern generator for generating a test pattern. The pattern generator 115 generates a test pattern signal for forming a predetermined gradation pattern in the formation of each of the CMYK colors in linkage with the image formation by the print head 110.

Reference numeral 116 denotes a printer controller for creating binary data by developing data and sending it to the print head in accordance with instructions from a host computer (not shown).

The printer controller 116 and the selector 109 are connected to each other by a data transfer line capable of transferring CMYK binary data in parallel. Also, the table conversion circuit 114 and the printer controller 116 are connected to each other by a command data transfer line for communicating a command in both directions.

Figure 3:
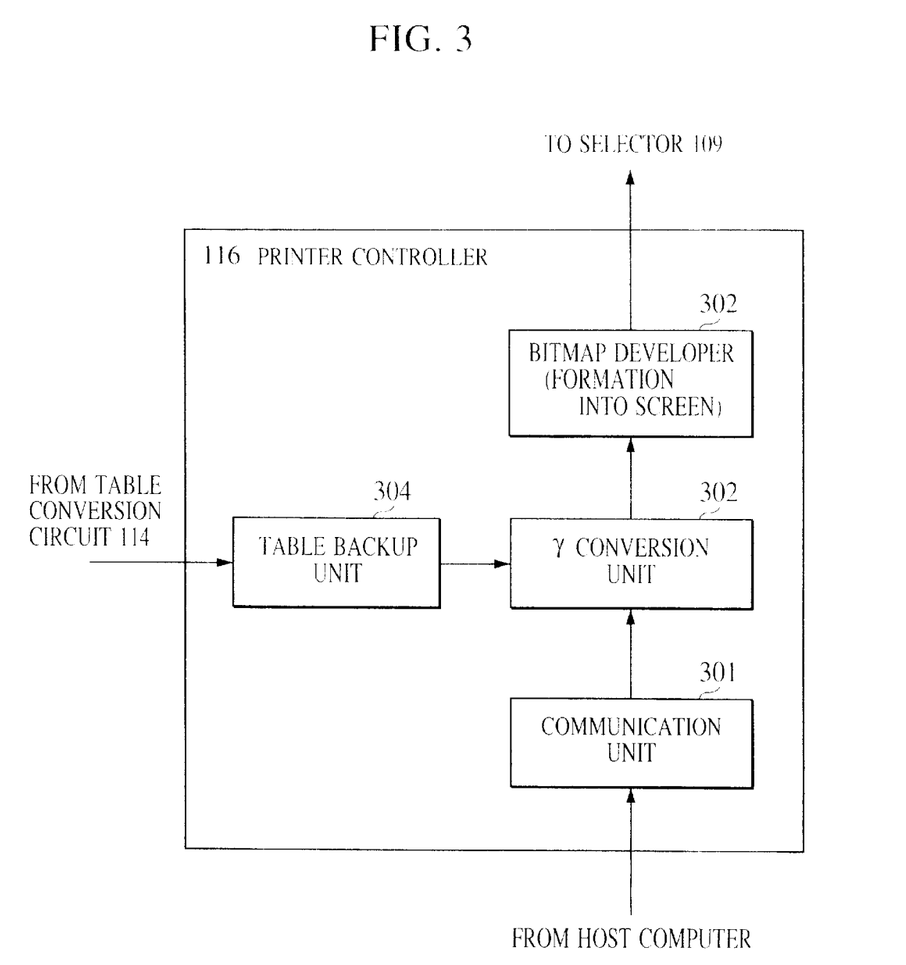
FIG. 3 is a block diagram of a printer controller according to the first embodiment of the present invention.

FIG. 3 is a block diagram of the printer controller 116.

Referring to FIG. 3, reference numeral 301 denotes a communication unit for receiving image data sent from the host computer. Reference numeral 304 denotes a table backup unit for backing up the γ table sent from the table conversion circuit 114 inside the copier. Reference numeral 302 denotes a γ conversion unit for performing γ conversion on image data by using the γ table stored in the table backup unit 304. Reference numeral 303 denotes a bitmap developer for developing data into a bitmap and for performing binarization by screen.

Next, a description is given of a process for creating a γ table corresponding to the printing gradation characteristics of a copier constructed as shown in FIG. 1.

When a γ table for a copier is created, first, the pattern generator 115 generates a test pattern signal. This test pattern signal is input as image data by the selector 104 and is input to the γ conversion circuit 107 after passing through a LOG conversion process and a color conversion process.

When creating a gradation correction table, the γ conversion circuit is passed through. The binarization circuit 108 performs a binarization process by using a density-storing-type binarization technique of an error diffusion system. Then, the data is output to the print head 110 via the selector 109, and a pattern image is printed on the basis of the binary data by using the print head. The pattern image includes a plurality of patches having a plurality of gradations in a monochromatic color for each of the CMYK colors of a recording material.

Then, this printed pattern image is read by the document reading apparatus 250. The data input by the input sensor section 101 passes through the correction circuit 102 and the filter 103, and is output to the image memory 111 by the selector 104. The data representing the same patch output from the selector 104 is averaged by a CPU (not shown), and the averaged data, as read data (patch image data) corresponding to each patch, is stored in the image memory 111.

The computation circuit 112 computes the γ table for gradation correction on the basis of the image data stored in the image memory 111. The γ table is determined so that the characteristics of the printer determined based on the image data are corrected to linear characteristics. The computed γ table is stored in the backup RAM 113.

During normal image copying, it is possible to stabilize the printing gradation characteristics by performing gradation correction, on the basis of the γ table stored in the backup RAM 113, in the γ conversion circuit 107.

Furthermore, since the printed pattern image is read by using a scanner section of the copier, there is no need to prepare a colorimeter, etc., as a reading apparatus for a pattern image, and further, it is possible to read a pattern image more easily than that for the colorimeter.

Next, a description is given of a process for creating a γ table corresponding to the gradation characteristics when printing is performed based on binary data from the printer controller.

The gradation characteristics of an image binarized by an error diffusion technique differ from those of an image binarized by screen (dithering). As in this embodiment, when binarization of an error diffusion system is performed inside the copier and when binarization by screen is performed in the printer controller, it is not possible to obtain satisfactory outputs for both by the same γ table.

Accordingly, in this embodiment, a γ table for a printer controller (screen) is created from the γ table computed for a copier (error diffusion).

The γ table computed for a copier, sent from the backup RAM 113, is input to the table conversion circuit 114. The table conversion circuit 114 converts the γ table into one for a printer in accordance with a conversion rule. This conversion rule is such that the correlation of variations of printing characteristics due to environmental variations, etc., related to binarization by the error diffusion system and binarization by screen, determined by experiments in advance, is formed into a table in advance.

The converted table is sent to the printer controller 116 through the command transfer line in accordance with a predetermined protocol, and is stored in the table backup 304.

In this manner, since the γ table for the printer controller is predicted from the γ table for the copier, the patch image needs only to be output when the γ table for the copier is created. Therefore, it is possible to create the γ table for the copier and the γ table for the printer controller without bothering a user much (effort, time, etc.).

More specifically, in a recording apparatus that uses a halftone reproduction method which differs between when it is used as a copier and when it is used as a printer, it is possible to calibrate gradation characteristics of the two halftone reproduction methods easily and in a short time.

According to this embodiment, it is possible to create a γ table suitable for each of a copier and a printer controller which use a different binarization method. Therefore, it is possible to satisfactorily stabilize the output image in both the copier and the printer.

Furthermore, since the γ table creation function is provided inside the copier, the construction of the printer controller can be simplified, and the cost of the printer controller can be reduced.

Second Embodiment

Figure 4:
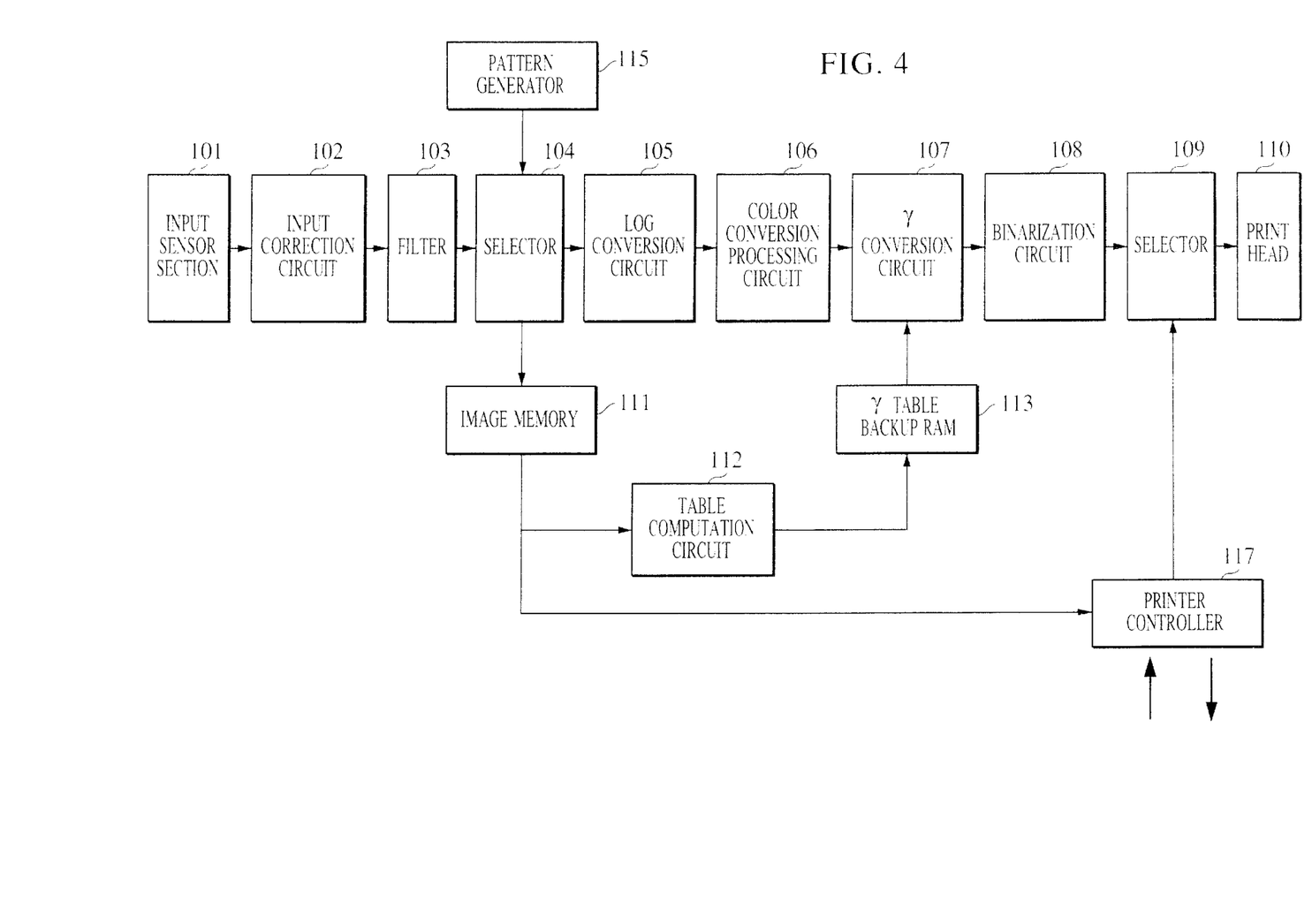
FIG. 4 is a block diagram of an image processing section according to a second embodiment of the present invention.

FIG. 4 is a block diagram of an image processing section according to a second embodiment of the present invention. Circuits in FIG. 4 which are constructed similarly to those of FIG. 1 are given the same reference numeral, and accordingly, descriptions thereof have been omitted.

The difference of FIG. 4 from FIG. 1 is that there is no table conversion circuit. In this embodiment, a γ table for a printer controller is created inside the printer controller. For this purpose, in this embodiment, patch image data stored in the image memory 111 can also be transferred to a printer controller 117. A table computation circuit 305 sequentially inputs each patch image data from the image memory 111 in accordance with a predetermined protocol.

Figure 5:
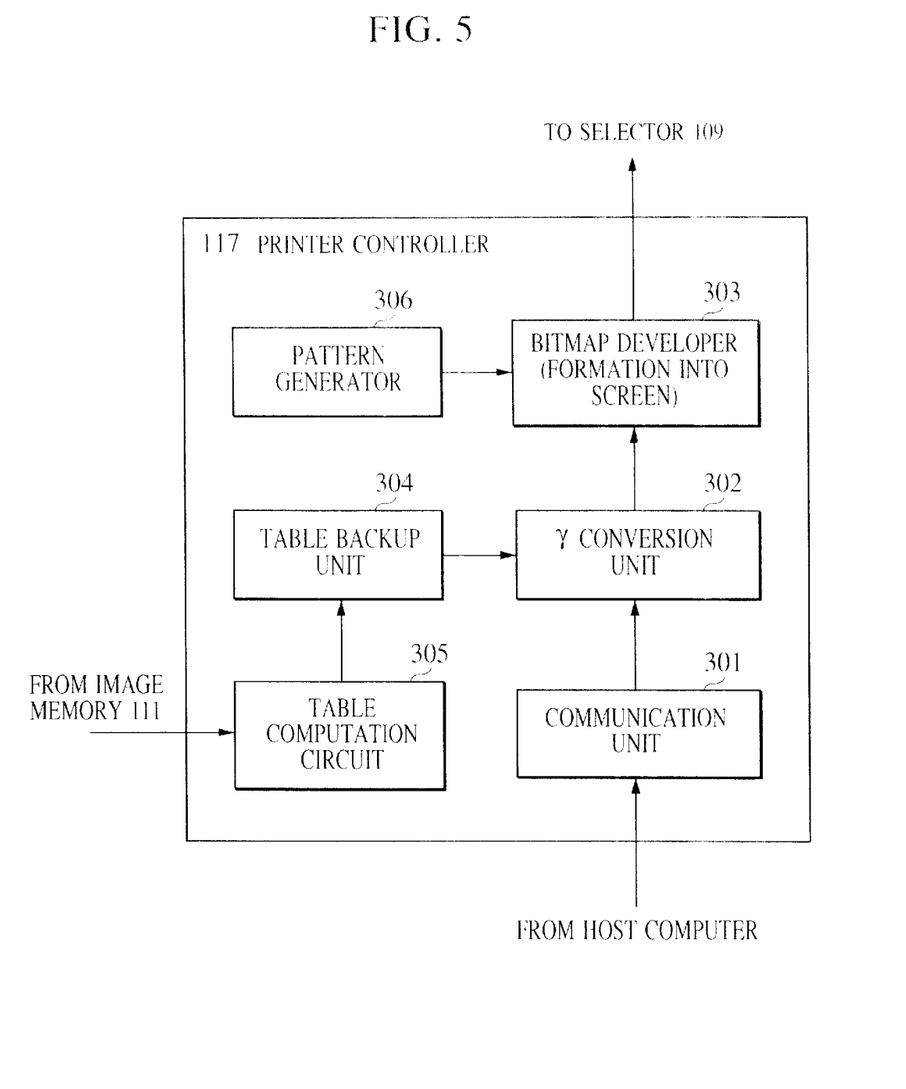
FIG. 5 is a block diagram of a printer controller according to the second embodiment of the present invention.

FIG. 5 shows a block diagram of the printer controller 117.

Reference numeral 301 denotes communication means for receiving data sent from the host computer. Reference numeral 302 denotes γ conversion means for performing γ conversion on multi-valued image data. Reference numeral 303 denotes development means for developing data into a bitmap and performing a binarization process using a screen. Reference numeral 304 denotes backup means for backing up a γ table created by the table computation circuit 305. Reference numeral 305 denotes a table computation circuit for computing a γ table used to appropriately correct the printing gradation characteristics of the printer on the basis of the data of the image memory. Reference numeral 306 denotes a pattern generator for generating a test pattern signal corresponding to the gradation characteristics of a halftone reproduction method (binarization method) of the printer controller.

In the second embodiment, in order to create a γ table when it is used as a printer, initially, a binary test pattern signal for a printer is generated by the pattern generator 306. This test pattern signal is passed through the development means 303 and is input to the print head 110 via the selector 109. Then, a pattern image for the printer controller is output by the print head 110.

The output pattern image is placed on the document-holder glass 252, and reading is performed. The data input from the input sensor section 101 is passed through the input correction circuit 102 and the filter 103, and is stored in the image memory 111 through the selector 104. The stored pattern image data is sent to the printer controller 117.

Then, a γ table for gradation correction suitable for a halftone reproduction method for a printer is computed by the table computation circuit 305 inside the printer controller 117. The computed γ table is stored in the backup means 304.

During printout, by performing gradation correction by the γ conversion means 302 on the basis of the γ table stored in the backup means 304, it is possible to correct the difference in the printing gradation characteristics for each unit.

According to the second embodiment, since a pattern image suitable for a binarization method of a printer controller can be output, it is possible to create a γ table for a printer controller, which is capable of correcting with high accuracy the printing gradation characteristics when it is used as a printer and is output.

Third Embodiment

Figure 6:
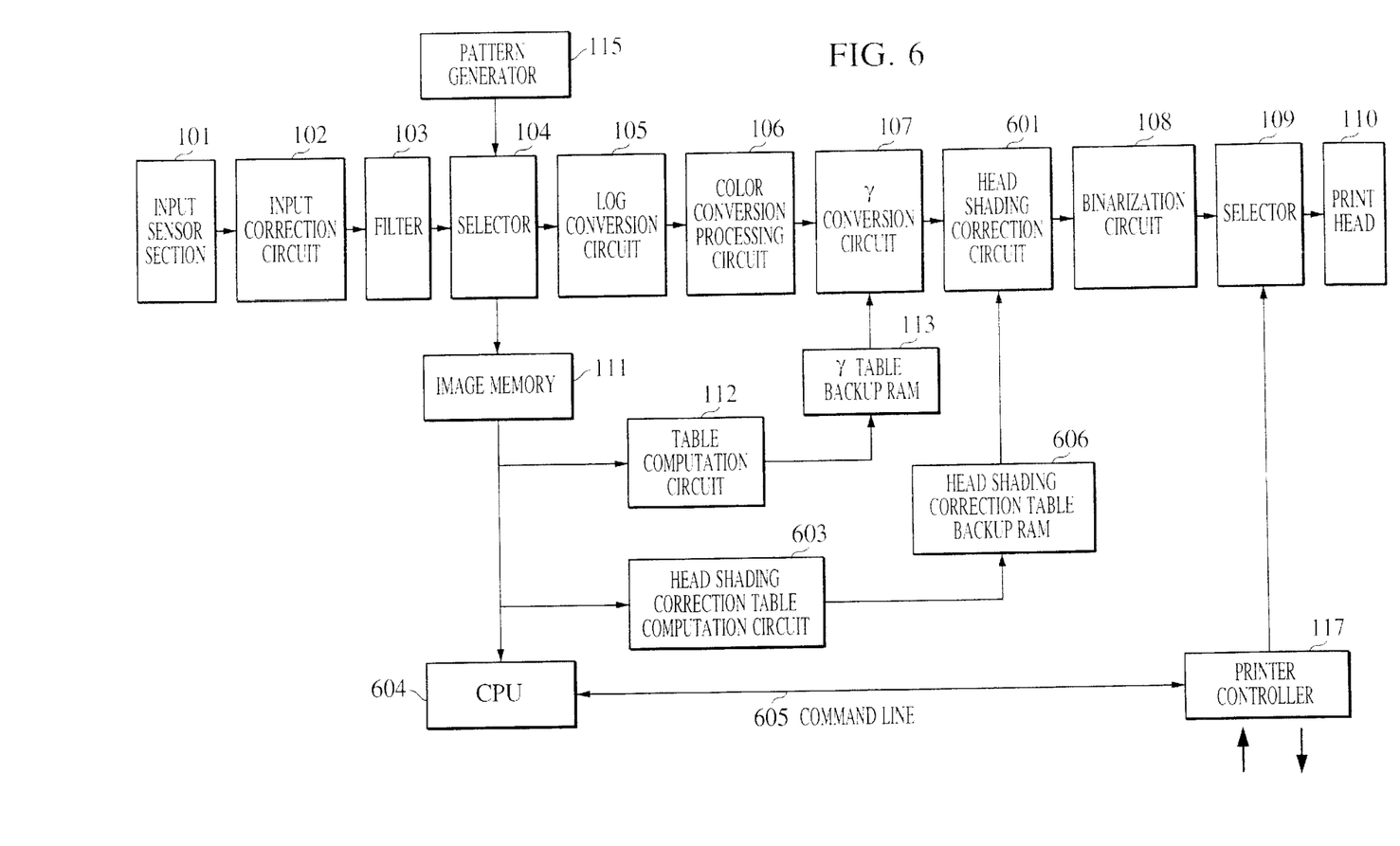
FIG. 6 is a block diagram of an image processing section according to a third embodiment of the present invention.

In this embodiment, in addition to a calibration mode for a copy mode in which a γ table corresponding to the binarization circuit 108 is calibrated and a calibration mode for a printer mode in which a γ table corresponding to the bitmap development means 303 of the controller is calibrated, a mode in which a head shading correction table is calibrated is provided.

A head shading correction circuit 601 corrects variations between devices of an LED array 212, and corrects input data by using correction data corresponding to a device on the basis of the device which forms the input data.

FIG. 6 is a block diagram of an image processing section according to a third embodiment of the present invention. Circuits in FIG. 6 which are constructed similarly to those of FIG. 4 are given the same reference numeral, and accordingly, descriptions thereof have been omitted.

In this embodiment, similarly to the second embodiment, patch image data stored in the image memory 111 is transferred to the printer controller 117 by using a command line 605 in accordance with a predetermined protocol. In FIG. 6, to make clear the construction, a CPU 604 for controlling the command line is shown.

A head shading correction table is created in the following manner.

A pattern for creating a head shading correction table is generated by the pattern generator 106, and the pattern is printed by the print head 110. The pattern is a monochromatic halftone image for each of the CMYK colors. The printed pattern is read and is stored in an image memory 602 through the input correction circuit 102 and the filter 103. A head shading correction table computation circuit 603 detects variations of the density of the halftone image, creates a correction table for each device on the basis of the variations at the position of each device, and stores it in a head shading correction table backup RAM 606 in such a manner as to correspond to each device.

Furthermore, in another calibration for the copy mode in this embodiment, a pattern is printed in the following manner.

In a manner similar to the above-described embodiments, a test pattern signal generated from the pattern generator 115 is passed through the LOG conversion circuit 105, the color conversion processing circuit 106, and the γ conversion circuit 107. Then, head shading correction and binarization are performed on the test pattern signal, and the pattern is printed by using the print head. The reason head shading is performed when printing the pattern is because the head shading correction is a process for compensating for the reproducibility of the print head.

The calibration mode for the copy mode, the calibration mode for the printer mode, and the mode for calibrating the head shading correction table are performed in accordance with instructions from a user who uses an operation panel (not shown).

The calibration mode for the printer mode can also be performed in accordance with an instruction from a host computer. In this case, the mode (printing of the pattern) is performed by instructing the CPU to execute the mode from the printer controller 117 via the command line 605 in accordance with an instruction from the host computer.

In this embodiment, the calibration mode for the copy mode and the calibration mode for the printer mode can be performed simultaneously. However, the calibration mode for the copy mode and the mode for calibrating the head shading correction table cannot be performed simultaneously.

The calibration for the copy mode and the calibration for the printer are subject to influences of the binarization circuit 108 and the bitmap developer 303, respectively, and are independent of each other. Therefore, even if the pattern for the copy mode and the pattern for the printer are output in sequence and are read in sequence, and each table is created, no problem arises.

In contrast, the head shading correction table exerts an influence on the printing characteristics. Therefore, it is not possible to simultaneously perform the calibration mode for the copy mode and the mode for calibrating the head shading correction table.

Another Embodiment

Although in the above-described embodiments a binarization process is performed as a quantization process, a quantization process, such as 3-value-ization or 4-value-ization, may be used according to the performance of the print head.

Also, although in the above-described embodiments a γ table is created according to the printing gradation characteristics, a color conversion process may be performed according to the printing gradation characteristics. In that case, not only a monochromatic pattern of the CMYK colors, but also a pattern of mixed colors is output as a pattern image.

Also, an embodiment is included within the scope of the present invention, in which program codes of software for realizing the functions (for example, the function for creating a γ table for a copier and a γ table for a printer controller) of the above-described embodiments are supplied to a computer within an apparatus or a system connected to various devices so that the various devices are operated to realize the functions of the above-described embodiments, and the computer (CPU or MPU) of the system or the apparatus causes the various devices to operate in accordance with the stored program.

In this case, the program codes of the software themselves realize the functions of the above-described embodiments, and the program codes themselves and a means for supplying the program codes to a computer, for example, a storage medium storing such program codes, constitute the present invention.

As storage media for storing such program codes, for example, floppy disks, hard disks, optical disks, magneto-optical disks, CD-ROMs, magnetic tape, non-volatile memory cards, ROMs, etc., may be used.

Not only in a case in which the functions of the above-described embodiments are realized by executing supplied program codes by a computer, but also in a case in which the functions of the above-described embodiments are realized by the program codes in collaboration with an OS (operating system) running in a computer or in collaboration with another application software, it is a matter of course that such program codes are included in an embodiment of the present invention.

In addition, it is a matter of course that a case is also included in the present invention in which after supplied program codes are stored in a memory provided in a function expansion unit connected to a function expansion board of a computer or connected to a computer, a CPU, which is provided in the function expansion board or in a function storage unit, performs a part or the entirety of actual processing in accordance with the instructions of the program codes, and the functions of the above-described embodiments are realized by the processing.

The present invention is not limited to the above embodiments and various changes and modifications can be made within the spirit and scope of the present invention.

Therefore, to apprise the public of the scope of the present invention the following claims are made.

What is claimed is:

1. An image forming apparatus, comprising:

reading means for reading an original document and producing first image signals;

input means for inputting second image signals from an external apparatus;

image forming means for forming an image on a recording medium on the basis of the first and second image signals produced by said reading means and input by said input means, respectively;

calibration means for calibrating image processing conditions corresponding to image forming characteristics in a copier mode; and production means for producing image processing conditions in a printer mode on the basis of said calibrated image processing conditions, wherein said image forming apparatus has the copier mode in which an image is formed by using said reading means and said image forming means and the printer mode in which an image is formed by using said input means and said image forming means.

2. An image forming apparatus according to claim 1, wherein an image signal input from said external apparatus is quantized image data.

3. An image forming apparatus according to claim 1, further comprising transferring means for transferring the image processing conditions in said printer mode to said external apparatus.

4. An image processing method for calibrating image correction conditions corresponding to each halftone process based on first and second halftone methods, said image processing method comprising the steps of:

producing first image correction conditions corresponding to said first halftone method on the basis of pattern image signals which are obtained by reading a pattern image which is halftone-processed and output by said first halftone method; and producing second image correction conditions corresponding to said second halftone method from said first image correction conditions on the basis of the correlation between said first and second halftone methods.

5. An image processing method according to claim 4, wherein said halftone process is a quantization process, and said first and second halftone methods are an error-diffusion-based method and a screen-based method, respectively.

6. A computer-readable recording medium for recording a program for executing an image processing method for calibrating image correction conditions corresponding to each halftone process based on first and second halftone methods, said program comprising:

codes for producing first image correction conditions corresponding to said first halftone method on the basis of a pattern image signal obtained by reading a pattern image which is halftone-processed and output by said first halftone method; and codes for producing second image correction conditions corresponding to said second halftone method from said first image correction conditions on the basis of the correlation between said first and second halftone methods.

\* \* \* \* \*